Oct. 30, 1928.

J. A. GRAY 1,689,670

ENTRAIL COLLECTING MEANS FOR EVISCERATING APPARATUS

Filed Aug. 18, 1925

INVENTOR.
James A. Gray
BY Harry A. Toulmin
ATTORNEYS.

Patented Oct. 30, 1928.

1,689,670

UNITED STATES PATENT OFFICE.

JAMES A. GRAY, OF SAN FRANCISCO, CALIFORNIA, ASSIGNOR TO AMERICAN CAN COMPANY, OF SAN FRANCISCO, CALIFORNIA, A CORPORATION OF NEW JERSEY.

ENTRAIL-COLLECTING MEANS FOR EVISCERATING APPARATUS.

Application filed August 18, 1925. Serial No. 50,897.

My invention relates in general to the fish-cleaning art, and concerns particularly that method and means which comprise, as one of the steps or functions, the cutting of the fish to afford an opening to body cavity, and the subsequent withdrawal of the viscera through said opening by the application of suction.

In devices for accomplishing this eviscerating function, as heretofore employed, a difficulty has been encountered in properly co-ordinating the suction effect with facility in discharging the withdrawn viscera from the suction chamber, because the relation was such that if the discharge were quite free, the suction was inefficient; while, on the contrary, if the suction were strong, it was only because the viscera unduly clogged the discharge.

The object of my invention is to remedy this difficulty by providing a device or appliance in which the discharge from the sucton chamber is positively controlled and effected by means of a valve which also provides for efficient suction in the chamber.

In the accompanying drawings, I have shown the preferred form of my appliance, though it is to be understood that changes may be made without departing from the spirit or scope of the invention as defined by claims hereunto appended.

In the drawings—

It should be here explained that the method and apparatus of the prior art, in which my improved device is to be used, comprise a traveling carrier to which successive fish are supplied; means for severing the heads and tails of the fish to expose the body cavity; and a suction chamber with which the severed end of the fish is brought into tight communication whereby the viscera are withdrawn. Such an apparatus and method are disclosed respectively in Letters Patent of the United States Nos. 1,134,529 and 1,134,530, April 6, 1915, and in view of this known art, to which reference may be made if desired, I have not deemed it necessary to herein illustrate any of said apparatus other than the novel eviscerating appliance itself.

Figure 2:
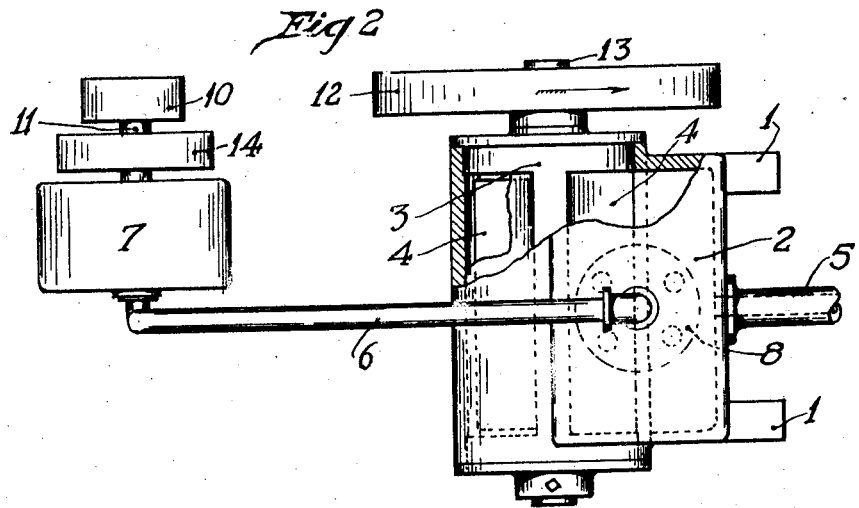
Fig. 2 is a top plan view of the same partly broken, and the belt 9 being omitted.
Figure 1:
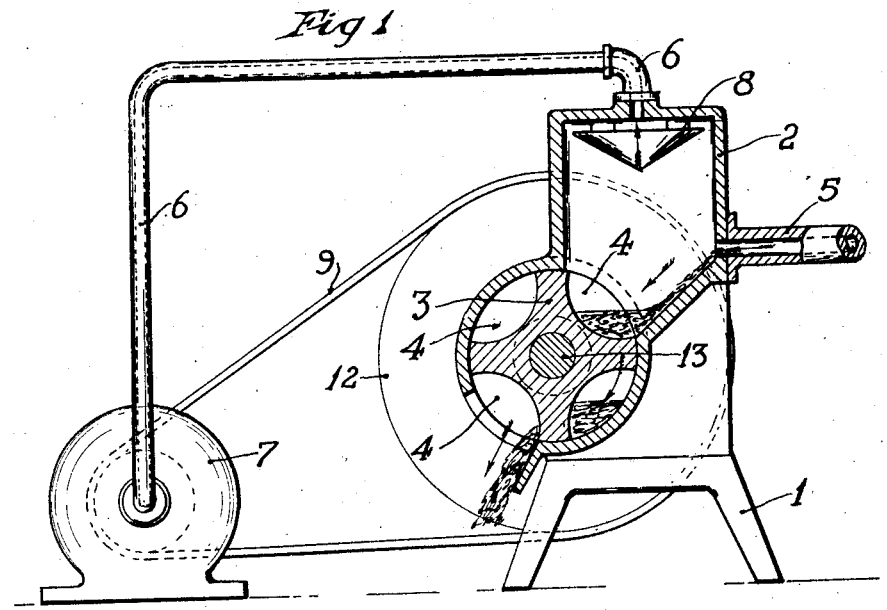
Fig. 1 is a vertical cross-section of the device, parts being shown in elevation.

1 is a stand upon which is carried the container 2. In the discharge throat of this container is seated a rotatable turret-like valve 3 the successive pockets 4 of which receive, carry down and discharge the contents of the container, as indicated by the arrows in Fig. 1, with an accuracy and positiveness precluding any possibility of clogging. The valve 3 being of the fluid-tight type also keeps the container closed for effective suction.

At the back of the container is the viscera-inlet connection 5, and its top is the suction connection 6 leading to a suction-pump 7. In the container 3 under the entrance of the suction connection 6 is a baffle 8. The controlling valve 3 is drven by a belt 9 from the pulley 10 of the suction-pump shaft 11, to a pulley 12 on the shaft 13 of the valve. The pump 7 is driven by a connection, not shown, to the pulley 14.

As each fish has its severed end brought into fluid tight registry with the outer end of the connection 5, the suction takes effect and withdraws the viscera from the fish and sucks them into the container. The revolving valve 3 while keeping the container tight and effective for suction, positively and without clogging carries the viscera away. The baffle 8 guards the suction connection 6 from any possible interference of portion or bits of the viscera and is adapted to deflect to the sides of the container and viscera which may be forced towards said connection 6.

I claim:

1. In an entrail collecting apparatus the combination of a container, an entrail conductor entering said container at a point above the bottom of the same, an air exhaust pipe leading from the top of the container, a smooth surfaced baffle depending below the opening of said exhaust pipe, and having an annular air space around the same, and a rotary pocketed valve in air-tight engagement with the bottom part of the container and operating to remove viscera therefrom.

2. In an entrail collecting apparatus the combination of a container, an entrail conductor entering said container at a point above the bottom of the same, an air exhaust pipe leading from the top of the container, a tapered smooth surfaced baffle depending below the opening of said exhaust pipe and having an annular air space around the same and adapted to deflect towards the sides of the container any viscera which may be forced toward the exhaust pipe, and a rotary pocketed valve in air-tight engagement with the bottom part of the container and operating to remove viscera therefrom.

In testimony whereof I have signed my name to this specification.

JAMES A. GRAY.